UNITED STATES PATENT OFFICE.

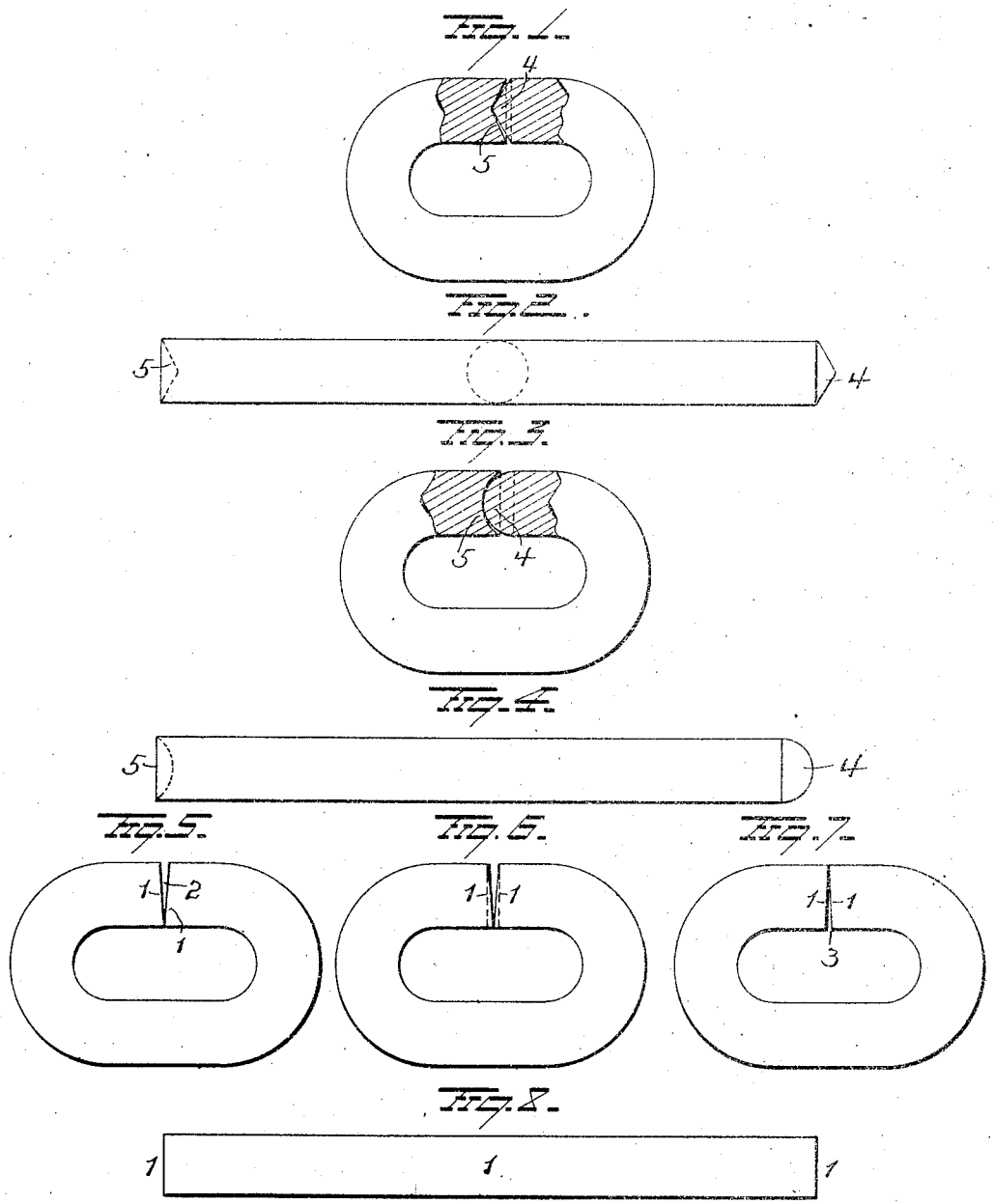

FREDERICK G. HALDY, OF STAMFORD, CONNECTICUT, ASSIGNOR TO THE YALE & TOWNE MANUFACTURING COMPANY, OF STAMFORD, CONNECTICUT.

METHOD OF WELDING.

No. 914,946.  Specification of Letters Patent.  Patented March 9, 1909.

Application filed July 25, 1908. Serial No. 445,346.

*To all whom it may concern:*

Be it known that I, FREDERICK G. HALDY, of Stamford, in the county of Fairfield and State of Connecticut, have invented certain new and useful Improvements in Methods of Welding; and I do hereby declare the following to be a full, clear, and exact description of the invention, such as will enable others skilled in the art to which it appertains to make and use the same.

My invention relates to improved method of welding, and the construction of the joint to be welded, and more particularly to the method of welding chain links, and chain link blanks.

The object of my invention is to secure a more uniform and perfect weld than can be secured with an electric welder between two flat abutting surfaces, and it consists in the formation of the abutting faces of the parts to be welded, so that they make contact at a point intermediate their margins, and preferably at the center, from which point of contact the heat will be rapidly and uniformly conducted to the margins of the abutting members.

In the accompanying drawings, Figure 1 is a view of my improved link before welding. Fig. 2 is a view of the bar from which the link is made. Fig. 3 is a view of a modified form of link and Fig. 4 is a view of the bar. Figs. 5, 6 and 7 are views showing the link as now universally made, and Fig. 8 is a view of the blank.

Link blanks as now constructed are provided with flat abutting faces as at 1 in Fig. 8, and when bent into the form shown in Fig. 5, the outer fibers are under tension and the inner fibers under compression, thus leaving an approximately V-shaped space 2 between the adjacent ends as shown in Fig. 5. In order to secure a uniform and strong weld, it is absolutely necessary to generate and distribute the heat uniformly over the surfaces to be joined, but with point contact at one margin, and an air gap gradually increasing in size from such point contact to the other margin, this is impossible. If the joint be milled as shown in dotted lines in Fig. 6, to produce parallel faces, and the ends of the link again forced together, a similar, but somewhat smaller inverted V-shaped gap will result as shown at 3 in Fig. 7, hence in welding these blanks by electricity, the heat localizes at the point of contact which results in burning the metal at such point, before the separated sections of the joint have reached a welding temperature. In order to overcome this defect I make the blank, shown in Fig. 2, with male and female ends 4 and 5 respectively, the angle subtended by the male end being a trifle less than the angle of the recessed or female end to insure contact at the center, as shown in Fig. 1, from which point the heat is conducted rapidly in all directions to the margins. Again, as soon as the contact point begins to soften under the influence of the heat, the end pressure, to which the link is subjected during the process of electric welding, causes the metal to flow from the center outwardly in all directions thus completely filling the gaps between the ends and forming a perfect weld.

In Fig. 5 I have shown one end of the blank rounded, the other end having a rounded or curved rounded recess. With this form I also make contact at or near the center which is the fundamental feature of this invention.

It is evident that the blank may be provided with ends having central point contact surfaces of other shapes than those shown, the general idea being to provide the blank with male and female ends, hence I do not confine myself to the construction shown but consider myself at liberty to make such changes as fairly fall within the spirit and scope of my invention.

Having fully described my invention what I claim as new and desire to secure by Letters-Patent, is:—

1. The method of making a chain link consisting in providing the link blank with a point at one end and a recess in the other end, projecting the pointed end into the recess in the other end and subjecting the joint thus formed to pressure and a welding heat.

2. The method of making a chain link consisting in providing a link blank with a point at one end and a recess at the other end, forcing the pointed end into the recess in the other end, heating the abutting ends of the blank by means of an electric current and forcing the abutting and telescoping ends together.

In testimony whereof, I have signed this specification in the presence of two subscribing witnesses.

FREDERICK G. HALDY.

Witnesses:
SCHUYLER MERRITT,
WARREN S. ABEL.